United States Patent
Ranzato et al.

(10) Patent No.: US 9,640,989 B2
(45) Date of Patent: May 2, 2017

(54) POWERED DEVICE CONTROLLERS HAVING SHARED CONNECTION INTERFACES AND TWO-LEVEL INRUSH CURRENT LIMIT

(71) Applicant: Maxim Integrated Products, Inc., San Jose, CA (US)

(72) Inventors: Mauro Ranzato, Torre D'Isola (IT); Andrea Vigna, Casanova Lonati (IT); Gaoling Zou, San Jose, CA (US); Thong A. Huynh, Fremont, CA (US); Gianluca Mariano, San Martino Siccomario (IT)

(73) Assignee: Maxim Integrated Products, Inc., San Jose, CA (US)

( * ) Notice: Subject to any disclaimer, the term of this patent is extended or adjusted under 35 U.S.C. 154(b) by 622 days.

(21) Appl. No.: 13/929,290

(22) Filed: Jun. 27, 2013

(65) Prior Publication Data

US 2014/0084691 A1 Mar. 27, 2014

Related U.S. Application Data

(60) Provisional application No. 61/706,210, filed on Sep. 27, 2012, provisional application No. 61/781,938, filed on Mar. 14, 2013.

(51) Int. Cl.
*H04L 12/10* (2006.01)
*H02J 1/00* (2006.01)

(52) U.S. Cl.
CPC .............. *H02J 1/00* (2013.01); *H04L 12/10* (2013.01); *Y10T 307/593* (2015.04)

(58) Field of Classification Search
CPC .............. H02J 1/00; H04L 12/10; G06F 1/266
USPC ............................................. 307/60
See application file for complete search history.

(56) References Cited

U.S. PATENT DOCUMENTS

| 2004/0210682 A1* | 10/2004 | Chartrand | G06F 3/162 |
| | | | 710/10 |
| 2005/0197094 A1* | 9/2005 | Darshan | H04L 12/10 |
| | | | 455/402 |
| 2006/0209875 A1* | 9/2006 | Lum | H04L 12/10 |
| | | | 370/445 |
| 2009/0243565 A1* | 10/2009 | Darshan | H04L 12/10 |
| | | | 323/234 |

\* cited by examiner

*Primary Examiner* — Fritz M Fleming
*Assistant Examiner* — Thai Tran
(74) *Attorney, Agent, or Firm* — Advent, LLP (57) ABSTRACT

A system for controlling the operation of isolation transistors in high power Power over Ethernet (PoE) networks to achieve greater power delivery to a load is disclosed. In one or more implementations, the system includes a first power over Ethernet (PoE) powered device controller configured to control power supply to a load, and a second PoE powered device controller coupled to the load and to the first PoE powered device controller. The second PoE powered device controller is connected to the first PoE powered device controller using a shared connection interface and is configured to control power supply to the load. The shared connection interface is configured to synchronize the first PoE powered device controller and the second PoE powered device controller to deliver power at least substantially contemporaneously to the load.

12 Claims, 7 Drawing Sheets

POWERED DEVICE CONTROLLERS HAVING SHARED CONNECTION INTERFACES AND TWO-LEVEL INRUSH CURRENT LIMIT

BACKGROUND

Power over Ethernet (PoE) technology describes passing electrical power, along with data, on Ethernet cabling. PoE technology is typically regulated by multiple IEEE standards. Power is supplied in common mode over two or more of the differential pairs of wires found in the Ethernet cables and comes from a power supply within a PoE-enabled networking device such as an Ethernet switch, or can be injected into a cable run with a midspan power supply. The basic elements of a PoE system are: 1) power sourcing equipment (PSE), a device such as a switch that provides ("sources") power on the Ethernet cable, and 2) a powered device powered by a PSE that consumes energy from the PSE. Examples of powered devices include wireless access points, Internet protocol (IP) telephones, and IP cameras.

SUMMARY

A system for controlling the operation of isolation transistors in high power Power over Ethernet (PoE) networks to achieve greater power delivery to a load is disclosed. In one or more implementations, the system includes a first power over Ethernet (PoE) powered device controller configured to control power supply to a load, and a second PoE powered device controller coupled to the load and to the first PoE powered device controller. The second PoE powered device controller is connected to the first PoE powered device controller using a shared connection interface and is configured to control power supply to the load. The shared connection interface is configured to synchronize the first PoE powered device controller and the second PoE powered device controller to deliver power at least substantially contemporaneously to the load.

A method based on a limiting two-level inrush current from a PoE powered device to a load for allowing power take over from a different (redundant) higher voltage power source is disclosed. The method includes supplying current from a first power over Ethernet (PoE) powered device at a fixed inrush current limit for a first time period to a load, and supplying current from another higher supply voltage PoE powered device at a second inrush current limit for a second time period to the load. The current supplied during the second time period supplies additional charge to the load to increase the power delivered to the load while maintaining continuous power delivery.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures.

DETAILED DESCRIPTION

Overview

Power over Ethernet networks are configured to provide power, as well as data, to a powered device through Ethernet cables. Ethernet cables include modular connectors that interface with the powered devices, which furnish an electrical connection between the network and the powered devices.

Figure 1:
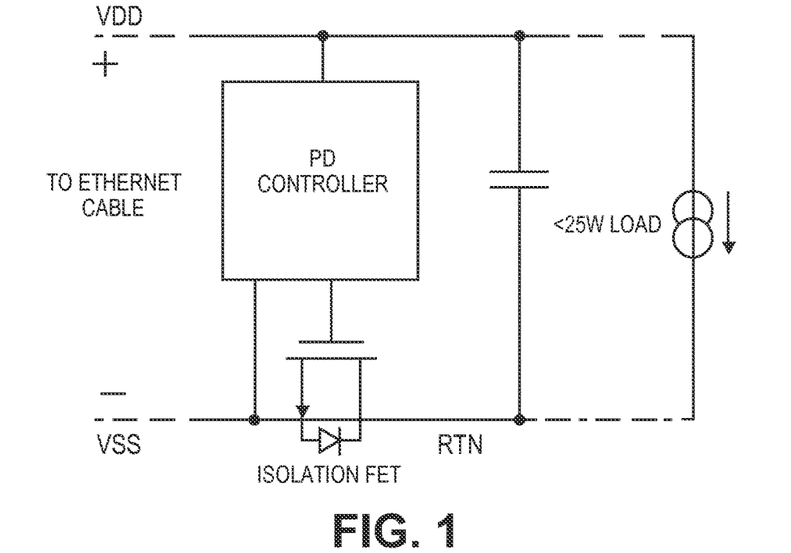
FIG. 1 is a diagrammatic illustration of a PoE powered device controller, where an isolation transistor is used to limit power supplied to a load.
Figure 2:
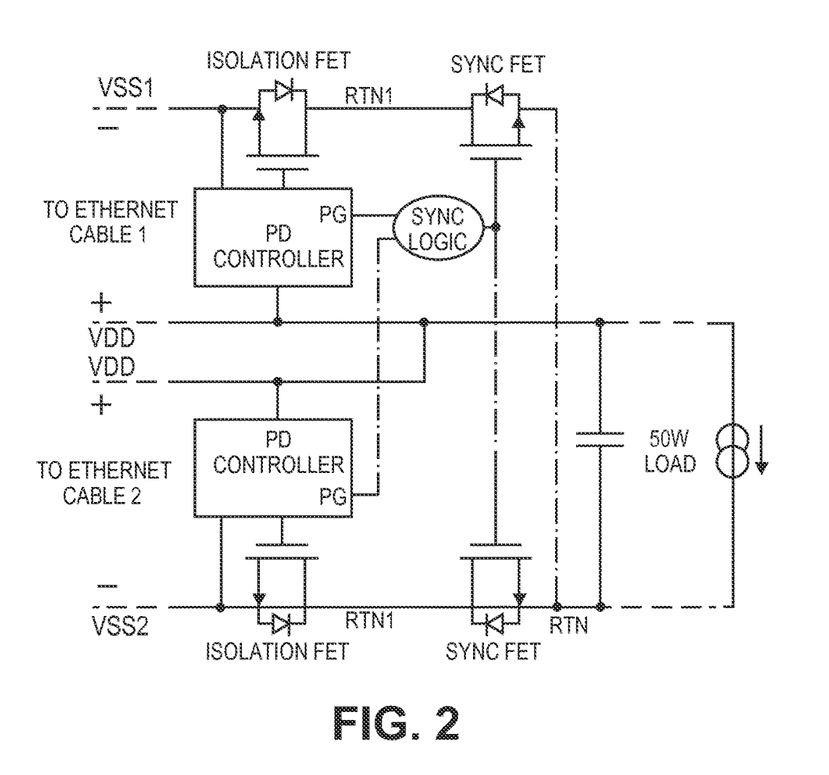
FIG. 2 is a diagrammatic illustration of two PoE powered device controllers connected in parallel, where each powered device controller includes a sync transistor in series with a second isolation transistor to control power supplied to a load.

Current IEEE 802.3at standards set the amount of power that can be delivered using a CAT5 cable Ethernet pair at twenty-five watts (25 W). An isolation transistor, such as a metal-oxide-semiconductor field-effect-transistor (MOSFET), is typically used at each powered device (PD) interface to comply with the IEEE 802.3at standards (e.g., as illustrated in FIG. 1). However, certain powered device applications require higher than the standard amount of power (e.g., greater than twenty-five watts (25 W)) to be delivered to a load. In these applications, multiple PoE channels (e.g., two or more powered device controllers connected in parallel) are used to control delivery of the required power supply to the load. Each PoE channel may include a high power isolation switch (e.g., a sync transistor) in series with a second isolation transistor, which is connected to the respective PD controller, to assist in controlling the load turn on and maintaining the power sources during various supply sequencing phases. Synchronization circuitry is typically employed to control operation of each sync transistor, as shown in FIG. 2. However, the synchronization circuitry and the high power isolation switches are external to the powered device controller, which requires dedicated application board design.

Thus, a system for controlling the operation of isolation transistors in high power Power over Ethernet (PoE) networks to achieve greater power delivery to a load is disclosed. In one or more implementations, the system includes a first power over Ethernet (PoE) powered device controller configured to control power supply to a load, and a second PoE powered device controller coupled to the load and to the first PoE powered device controller. The second PoE powered device controller is connected to the first PoE powered device controller using a shared connection interface and is configured to control power supply to the load. The shared connection interface is configured to synchronize the first PoE powered device controller and the second PoE powered device controller to deliver power at least substantially contemporaneously to the load. By utilizing the shared connection interface (e.g., a synchronization pin shared between each powered device controller), the system may not require the additional external synchronization circuitry or the additional isolation transistor.

Example Implementations

Figure 3:
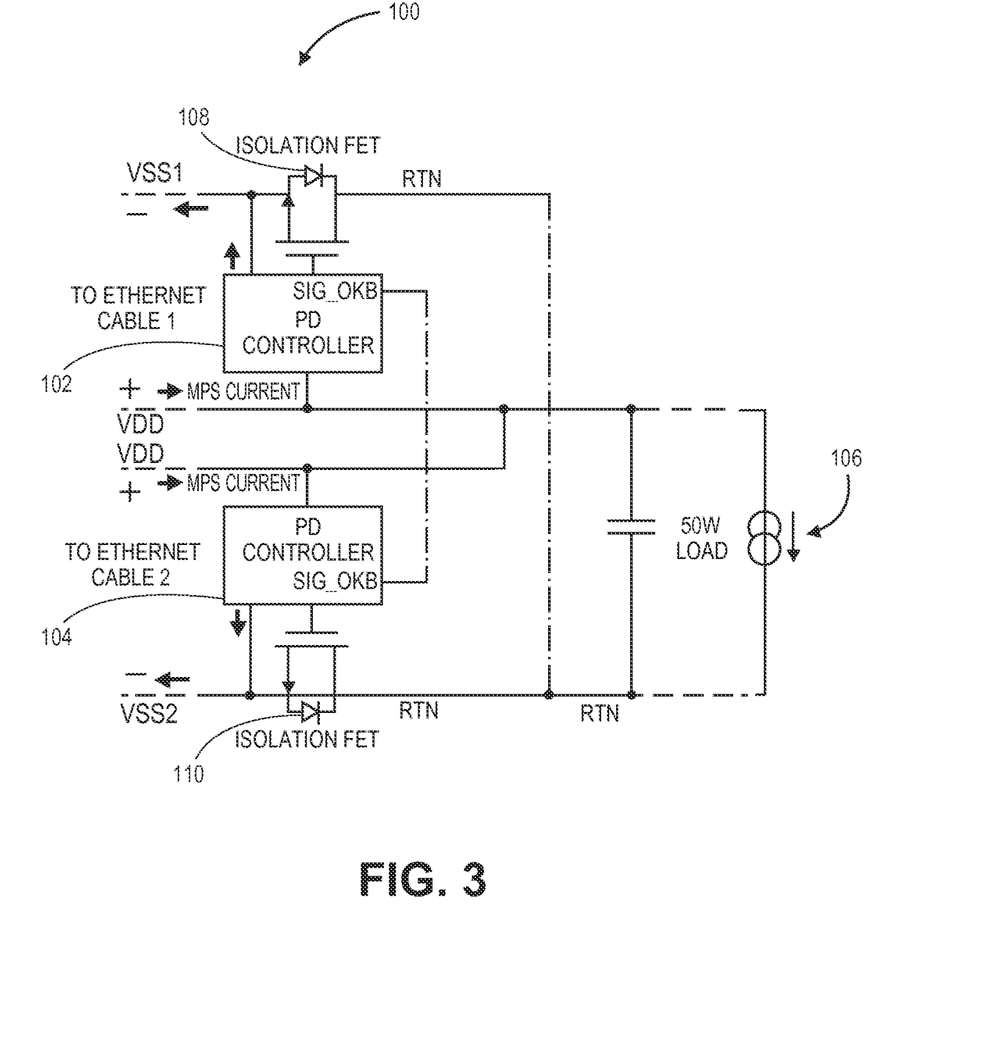
FIG. 3 is a diagrammatic illustration of two PoE powered device controllers connected in parallel, where the powered device controllers are coupled together using a shared connection interface to control power supplied to a load, and where the power supplied to the load is synchronized to be at least substantially contemporaneously delivered in accordance with an example embodiment of the present disclosure.

Referring generally to FIG. 3, techniques and systems are described for high power PoE delivery (e.g., greater than twenty-five watts (25 W)). In embodiments, a system 100 includes two or more PoE powered device controllers coupled together, such as a first powered device controller 102 and a second powered device controller 104. The system 100 is configured to deliver electrical power and data to a powered device via a PoE network. The PoE network can provide electrical power and data to the powered device via an Ethernet cable having modular connectors (e.g., an 8 Position 8 Contact (8P8C) connector, or the like). The powered device can comprise any powered device configured for use in a PoE network. Some examples of a powered device include a wireless access point, an Internet Protocol (IP) telephone, an IP camera, combinations thereof, etc.

The powered device controllers 102 and 104 are configured to couple to a load 106 to control power supplied to the load 106. In implementations, the first powered device controller 102 and/or the second powered device controller 104 can be configured to control power supplied to the load 106. In embodiments, the first and second powered device controllers 102 and 104 are coupled together using a shared connection interface configured to synchronize the first powered device controller 102 and the second powered device controller 104 to deliver power at least substantially contemporaneously to the load 106. For example, the first and second powered device controllers 102 and 104 can be coupled together using an interface circuit to control the actuation of at least one isolation field effect transistor (FET) associated with the powered device controllers (e.g., a first isolation FET 108 and/or a second isolation FET 110).

In embodiments, a shared connection pin (e.g., a SIG_OKB pin) can be included with a powered device controller and used for synchronization. The SIG_OKB pin can be used to synchronize the activation of a powered device controller (e.g., board turn on) by combining the power availability status of each powered device interface. This technique can enable board turn on only when required power sources are connected and ready to deliver the available power. In embodiments, when multiple powered device controllers are used in system 100, the SIG_OKB pins for all of the powered device controllers can be coupled together. Further, each powered device controller can be configured to hold SIG_OKB to VDD (positive supply voltage) until the powered device controller has been powered and its under-voltage-lockout (UVLO) is released.

In some embodiments, to avoid power interruption due to low current threshold violations, each powered device controller can enable a maintain power signature (MPS) current once powered (e.g., once a valid signature voltage is detected as indicated in the 802.at standard). The powered device controller can then monitor the SIG_OKB signal until the signal asserts a low status. In this manner, the MPS current can keep a PoE channel active by showing a valid load, for instance, to power sourcing equipment (PSE) on the other side of the Ethernet cable.

Figure 4:
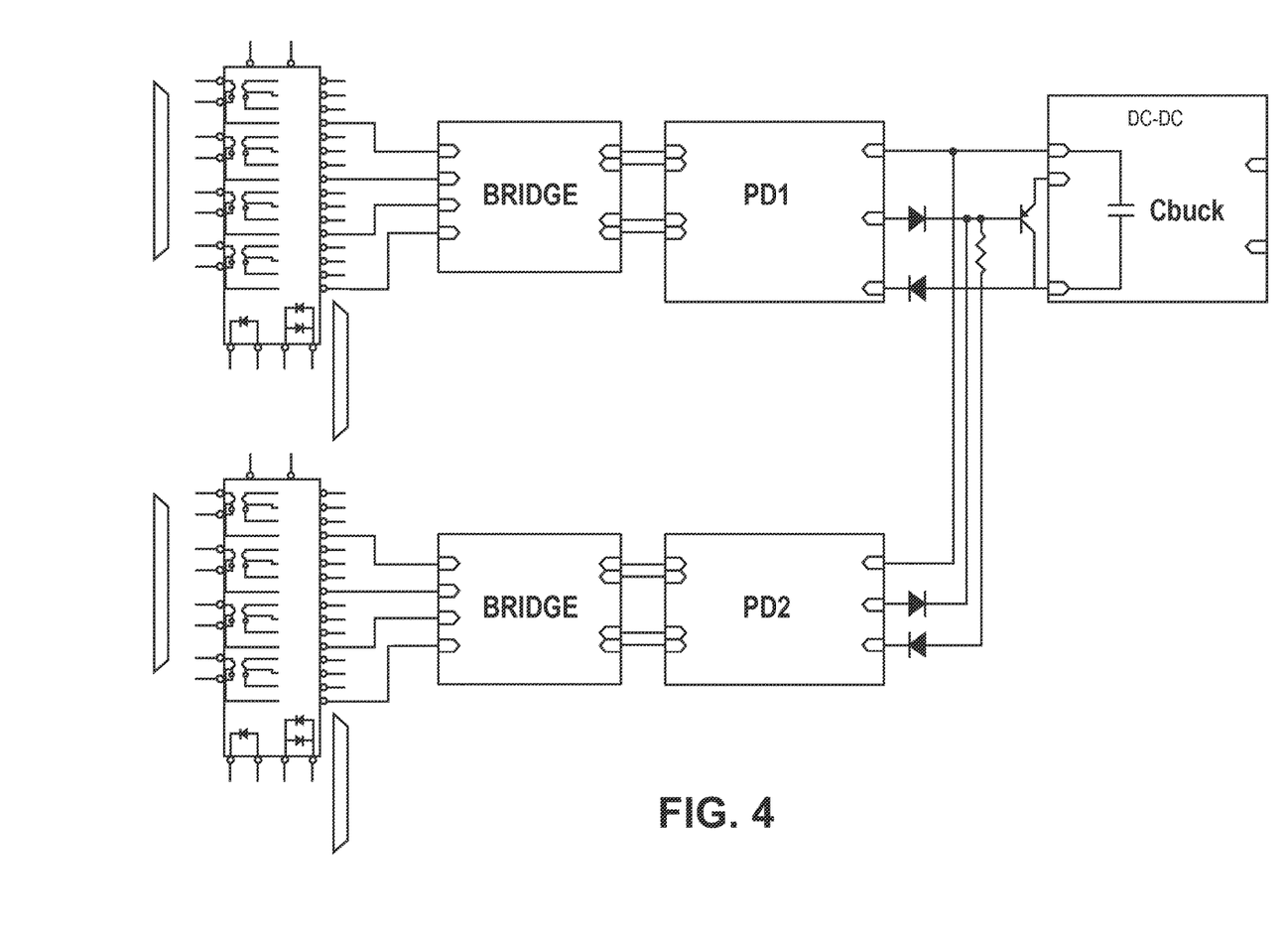
FIG. 4 is a diagrammatic illustration of a redundant PoE delivery implementation.
Figure 5:
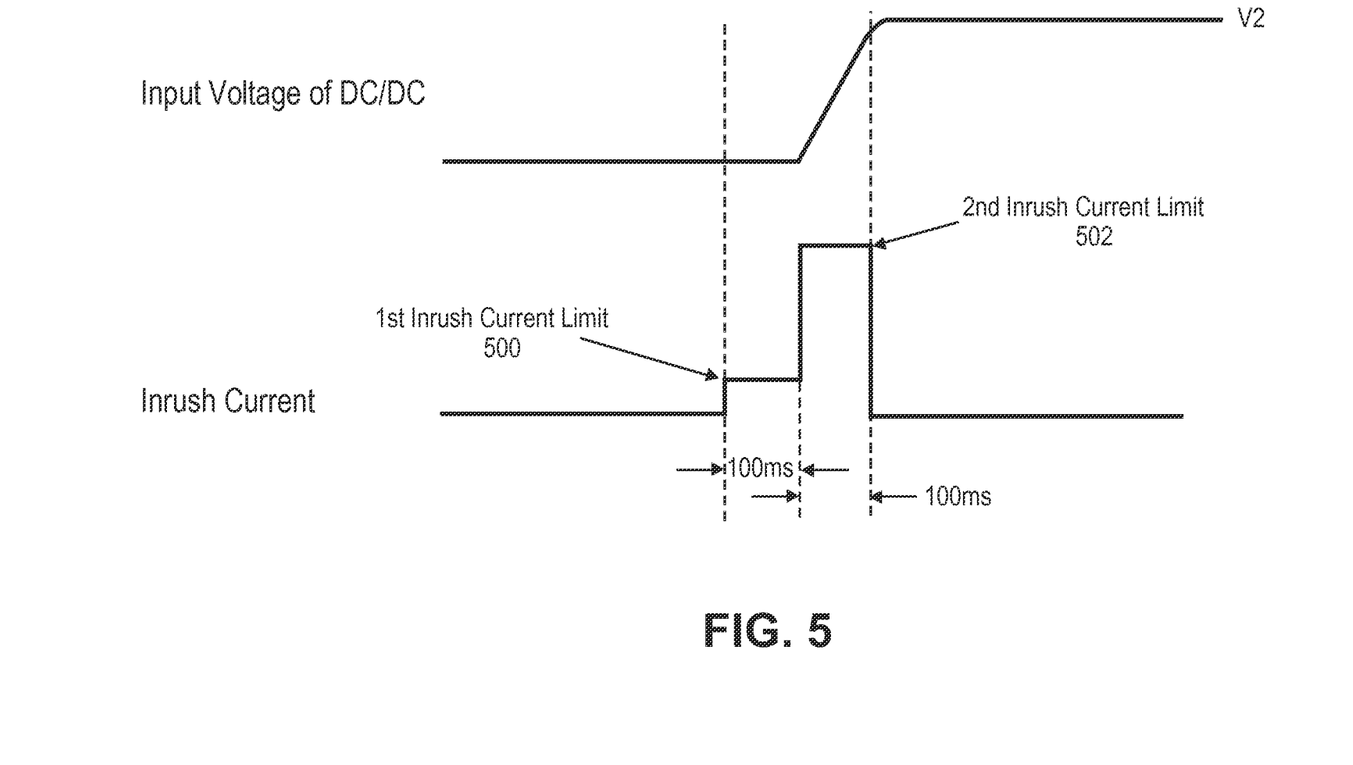
FIG. 5 is a diagrammatic illustration of a technique for limiting two-level inrush current from a PoE powered device to a load in accordance with an example embodiment of the present disclosure.

Referring generally to FIGS. 4 and 5, techniques and systems are described for redundant PoE delivery. In some embodiments, techniques of the disclosure can be used with PoE, direct current-to-direct current (DC/DC) converters, redundancy power, fiber-to-the-building (FTTB), fiber-to-the-home (FTTH), and so forth. As described in FIG. 4, generally there are two or more powered devices arranged together to power a load in redundancy PoE powered device applications. Each powered device can be connected to different PSE with its own power supply. Further, the voltages of each power supply can be different (e.g., forty-eight volts (48V) and/or fifty-four volts (54V)). One of the powered devices (e.g., the powered device with highest voltage) delivers power to the load. In some embodiments, the load can be a DC/DC converter with a bulk cap in the front (e.g., Cbuck 112 (or buck converter) as illustrated in FIG. 4). Other powered devices can then act as a standby for the first powered device. In one case where one PoE device supplying power to the load is away, another standby PoE device can source the load simultaneously (e.g., to avoid a power glitch to the load).

However, this configuration can be subject to undesirable operation in the case of a power switch event. For example, in a first case, a first powered device (PD1) is supplying power to the load, where the output voltage V1 is fifty-four volts (54V). In this example, a second powered device (PD2) is connected to its own PSE with a port voltage V2 of forty-eight volts (48V). After successful detection and classification, PD2 is operated in inrush control mode by limiting the inrush current to a predetermined level, such as one hundred thirty-five milliamps (135 mA) (e.g., so that the isolation switch works within a safe operating area (SOA) limit during the power up). Since V2 is lower than V1, PD2 does not need to charge Cbuck and is not able to supply the load. In this case, PD2 completes the inrush quickly, and the isolation switch of PD2 is fully enhanced afterwards. Thus, PD2 operates desirably in this case.

In a second case, PD1 is supplying the load with an output voltage of forty-eight volts (48V). PD2 is connected to its own PSE with a port voltage of fifty-four volts (54V). After successful detection and classification, PD2 is operated in inrush control mode. As V2 is higher than V1, PD2 will to take over the load from PD1. However, in addition to the load, PD2 needs to supply additional current to charge Cbuck to fifty-four volts (54V). This can require the current limit to be higher than the normal operation current of the load. In this specific case, the one hundred thirty-five milliamps (135 mA) limit may not be enough to supply the load nor to provide additional current to charge the input bulk cap of the DC/DC converter. In this case, PD2 may remain in the inrush current limit mode and may not take over. If PD1 is removed, then the load input power from PD1 is removed and PD2 powers up. Such operation may not be acceptable in many redundancy applications because the load eventually may experience a power interruption. One technique is to increase the inrush current limit to such a high level that PD2 can complete the power transition from PD1. However, PD2 may then have to violate an inrush current limit (e.g., four hundred fifty milliamps (450 mA) maximum during a period of seventy-five milliseconds (75 ms) in the IEEE802.3af/3at standard). For example, the port current could be up to six hundred milliamps (600 mA) in a Type II powered device. Thus, to power the load, PD2 may need to provide current of more than six hundred milliamps (600 mA) to source the load. This higher level of current may thus violate the standard with respect to the inrush current limit.

Referring now to FIG. 5, techniques are described for limiting two-level inrush current from a PoE powered device to a load for allowing power take over from a different (redundancy) higher voltage power source. As illustrated in FIG. 5, two different inrush current limits are shown. Current is supplied from a first PoE powered device to a load at a first (e.g., fixed) inrush current limit (e.g., inrush current limit 500) for a first time period (e.g., 100 ms). The inrush current limit 500 is low (e.g., with respect to a second inrush current limit as described below). Inrush current limit 500 is used so that the powered device isolation switch powers up within SOA and complies with an applicable PoE standard. Then, current is supplied from a second PoE powered device (e.g., another higher supply voltage PoE powered device) to the load at a second inrush current limit (e.g., inrush current limit 502) for a second time period (e.g., 100 ms). The current supplied during the second time period supplies additional charge to the load to increase the power delivered to the load while maintaining continuous power delivery. For example, the inrush current limit 502 has a higher level (as compared to inrush current limit 500) that the powered device can use to support both the load and Cbuck. Both of the inrush current limits 500 and 502 can be implemented using fixed timers (e.g., to prevent a FET from operating out of a SOA limit).

Figure 6:
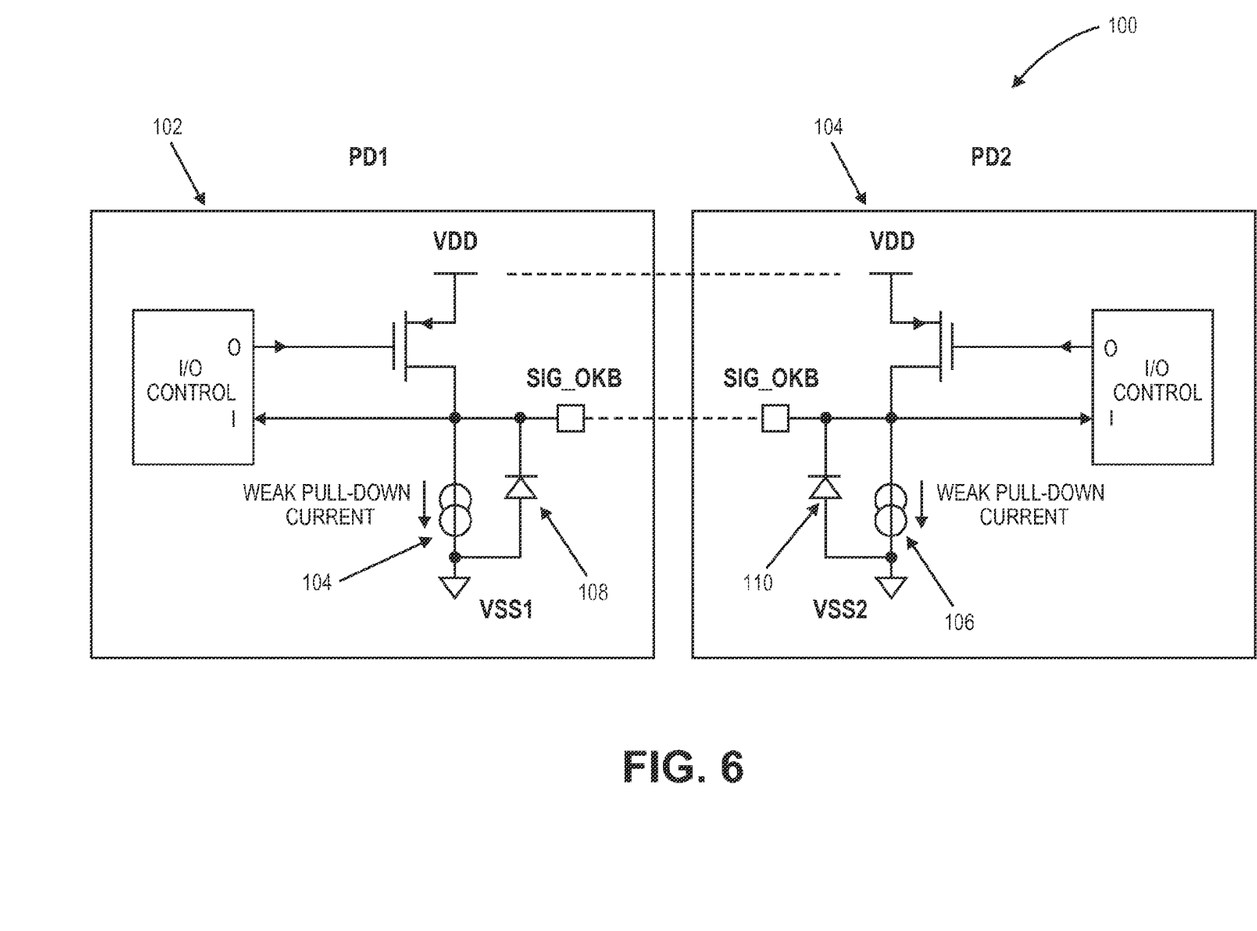
FIG. 6 is a diagrammatic illustration of a PoE powered device controller, where an isolation transistor is used to limit power supplied to a load.

Referring generally to FIG. 6, techniques and systems are described for high power PoE delivery (e.g., greater than twenty-five watts (25 W)). In embodiments, a system 100 includes two or more PoE powered device controllers coupled together, such as a first powered device controller 102 (PD1) and a second powered device controller 104 (PD2). The system 100 is configured to deliver electrical power and data to a powered device via a PoE network. The PoE network can provide electrical power and data to the powered device via an Ethernet cable having modular connecters (e.g., an 8 Position 8 Contact (8P8C) connector, or the like). The powered device can comprise any powered device configured for use in a PoE network. Some examples of a powered device include, but are not necessarily limited to, a wireless access point, an Internet Protocol (IP) telephone, an IP camera, combinations thereof, etc.

The powered device controllers 102 and 104 are configured to couple to a load 106 to control power supplied to the load 106. For example, the first powered device controller 102 and/or the second powered device controller 104 can be configured to control power supplied to the load 106. In embodiments, the first and second powered device controllers 102 and 104 are coupled together using a shared connection interface configured to synchronize the first powered device controller 102 and the second powered device controller 104 to deliver power at least substantially contemporaneously to the load 106. For example, the first and second powered device controllers 102 and 104 can be coupled together using an interface circuit to control the actuation of isolation FETs associated with the powered device controllers (e.g., a first isolation FET 108 and/or a second isolation FET 110).

Figure 7:
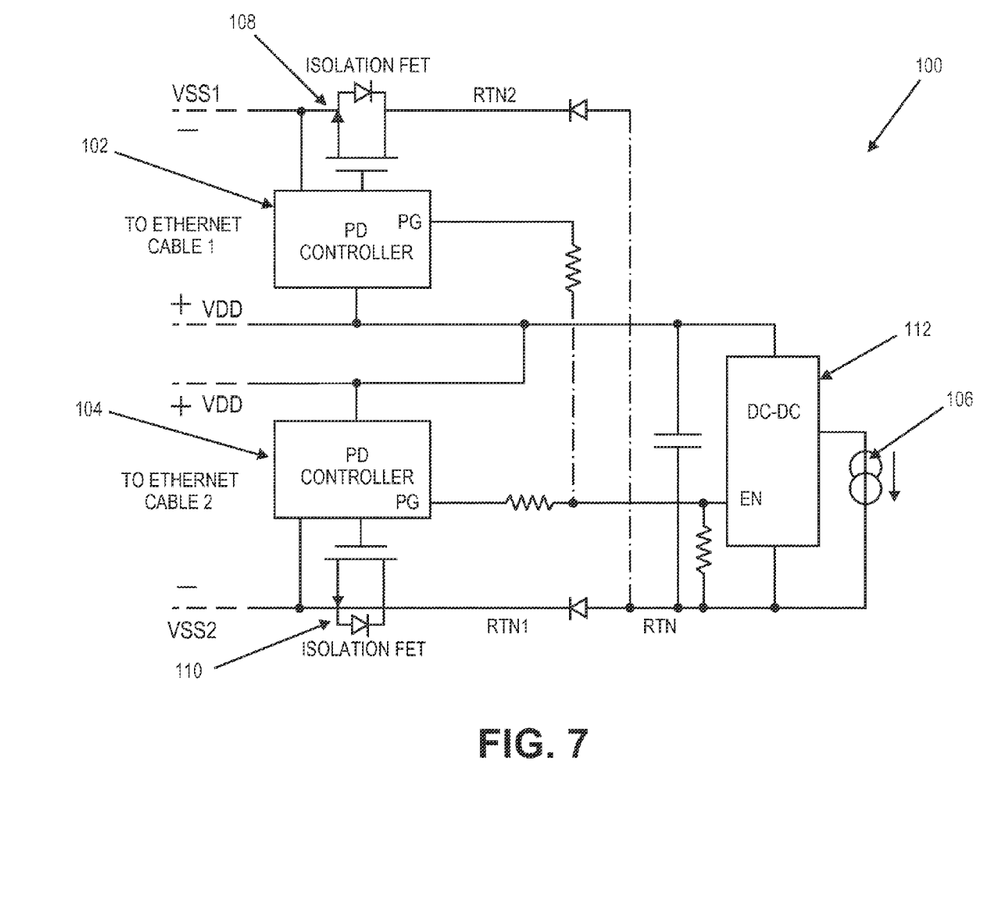
FIG. 7 is a diagrammatic illustration of a PoE powered device controller, where an isolation transistor is used to limit power supplied to a load.
Figure 8:
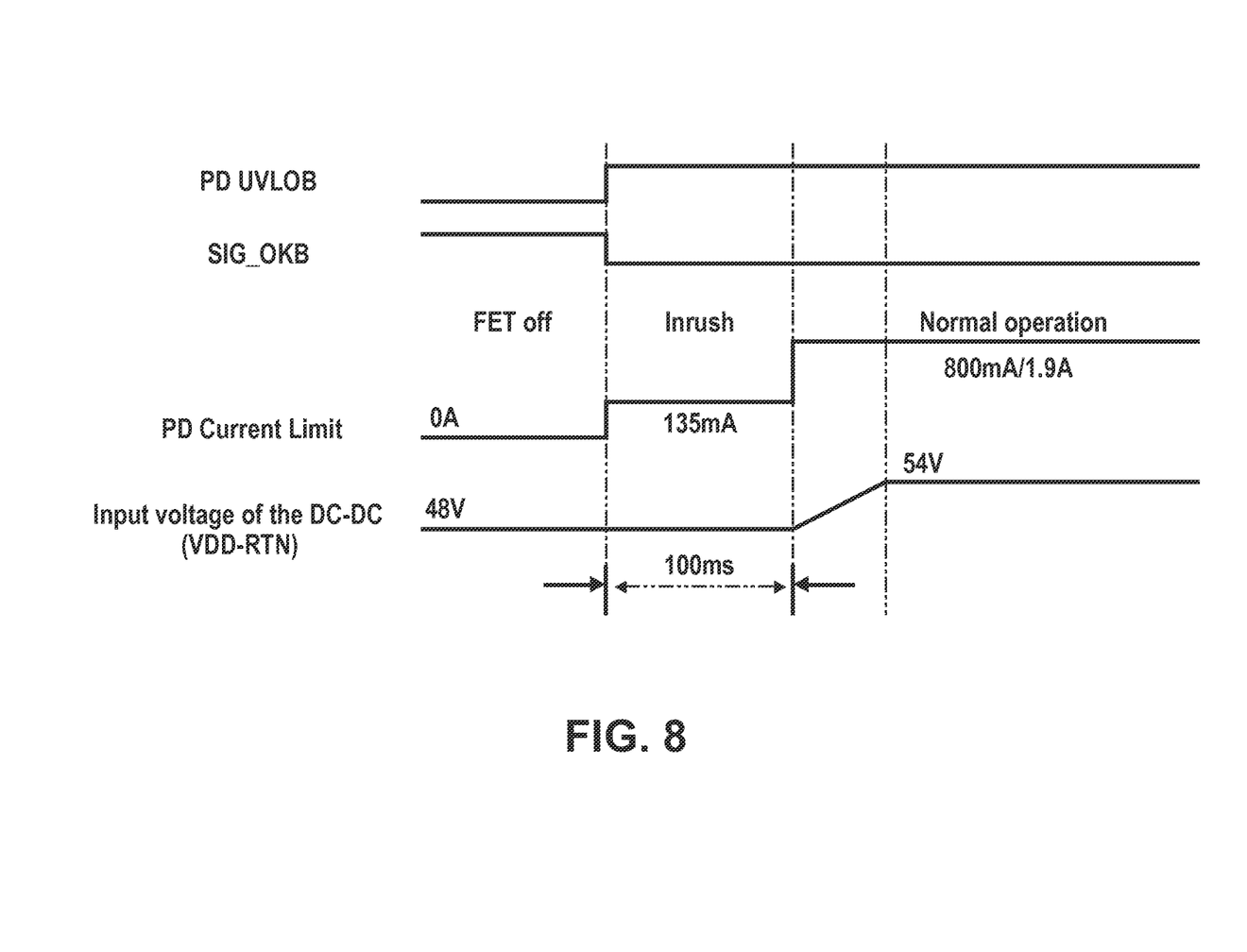
FIG. 8 is a diagrammatic illustration of a technique for limiting two-level inrush current from a PoE powered device to a load in accordance with an example embodiment of the present disclosure.

In some embodiments and as shown in FIG. 7, system 100 includes a DC-DC converter. In these embodiments, the DC-DC converter includes an electronic circuit which converts a source of direct current (DC) from one voltage level to another. In one embodiment and as illustrated in FIG. 8, two levels of in-rush current limit have been introduced and start up timings are set to meet IEEE standard requirements.

In this embodiment, the First Level Current Limit (e.g., 48V) is well below standard requirement and lasts for the first 100 ms of start up phase, as illustrated by the bottom line. The Second Level Current Limit (e.g., 54V in this example) is user programmable and starts after the 100 ms timer and lasts up to the completion of the start up phase (e.g., either V(RTN_)~VSS_ or 200 ms are elapsed). This example guarantees continuous power delivery to the load.

Conclusion

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system, comprising:
a first Power over Ethernet (PoE) powered device controller configured to control power supply to a load, the first power over Ethernet (PoE) powered device controller coupled to a first isolation field effect transistor;
a second Power over Ethernet (PoE) powered device controller coupled to the load and to the first PoE powered device controller, the second PoE powered device controller coupled to the first PoE powered device controller using a shared connection interface, the second PoE powered device controller configured to control power supplied to the load, the second Power over Ethernet (PoE) powered device controller configured to supply current to the load at a programmable inrush current limit, the second power over Ethernet (PoE) powered device controller coupled to a second isolation field effect transistor, the current implemented using a fixed timer to cause at least one of the first isolation field effect transistor or the second isolation field effect transistor to operate in a safe operating area (SOA),
wherein the shared connection interface is configured to synchronize the first PoE powered device controller and the second PoE powered device controller to deliver power at least substantially contemporaneously to the load, the shared connection interface includes internal synchronization in each powered device controller, the internal synchronization includes a synchronized pin shared between each powered device controller.

2. The system of claim 1, wherein each powered device controller enables a maintain power signature once powered.

3. The system of claim 1, further comprising:
a DC-DC converter configured to convert a source of direct current (DC) from a first voltage level to a second voltage level.

4. The system of claim 3, wherein the DC-DC converter includes a buck converter.

5. A system, comprising:
a first power over Ethernet (PoE) powered device controller configured to handle a first current from a first power over ethernet device at a first inrush current limit during a first time period, the first power over Ethernet (PoE) powered device controller coupled to a first isolation field effect transistor, the first inrush current limit implemented using a fixed timer to cause the first isolation field effect transistor to operate in a corresponding safe operating area (SOA); and
a second power over Ethernet (PoE) powered device controller configured to handle a second current from a second power over ethernet device at a second inrush current limit, where the second inrush current limit is higher than the first inrush current limit during a second time period, the second inrush current limit comprising a programmable inrush current limit, the second power over Ethernet (PoE) powered device controller coupled to a second isolation field effect transistor, the second inrush current limit implemented using the fixed timer to cause the second isolation field effect transistor to operate in the safe operating area (SOA), where the second PoE powered device controller is coupled to the first PoE powered device controller using a shared connection interface configured to synchronize the first PoE powered device controller and the second PoE powered device controller to deliver power at least substantially contemporaneously to the load, the shared connection interface including a synchronized pin shared between each powered device controller, wherein the first current and second current provide continuous power delivery to the load during the first time period and the second time period.

6. The system of claim 5, wherein each powered device controller enables a maintain power signature once powered.

7. The system of claim 5, further comprising:

a DC-DC converter configured to convert a source of direct current (DC) from a first voltage level to a second voltage level.

8. The system of claim 7, wherein the DC-DC converter includes a buck converter.

9. A method, comprising:

supplying current from a first power over Ethernet (PoE) powered device at a first inrush current limit for a first time period to a load according to a fixed timer to cause a first isolation field effect transistor to operate in a safe operating area (SOA), the first isolation field effect transistor coupled to the first power over Ethernet (PoE) powered device; and supplying current from a second power over Ethernet (PoE) powered device at a second inrush current limit for a second time period to the load according to the fixed timer to cause a second isolation field effect transistor to operate in a safe operating area (SOA), the second isolation field effect transistor coupled to the second power over Ethernet (PoE) powered device, the second inrush current limit comprising a programmable inrush current limit, wherein the current supplied during the second time period supplies additional charge to the load to increase the power delivered to the load, wherein the first power over Ethernet (PoE) powered device and the second power over Ethernet (PoE) powered device are coupled by a shared connection interface, the shared connection interface including a synchronized pin shared between each powered device controller, wherein the first current and second current provide continuous power delivery to the load during the first time period and the second time period.

10. The method of claim 9, wherein the first inrush current limit is lower than the second inrush current limit.

11. The method of claim 9, wherein supplying current from a first power over Ethernet (PoE) powered device includes supplying current to a DC-DC converter.

12. The method of claim 11, wherein supplying current to a DC-DC converter includes supplying current to a DC-DC converter having a buck converter.

* * * * *